No. 666,570. Patented Jan. 22, 1901.
O. A. STEUTERMANN.
JOURNAL BEARING.
(Application filed Apr. 14, 1900.)
(No Model.) 2 Sheets—Sheet 1.
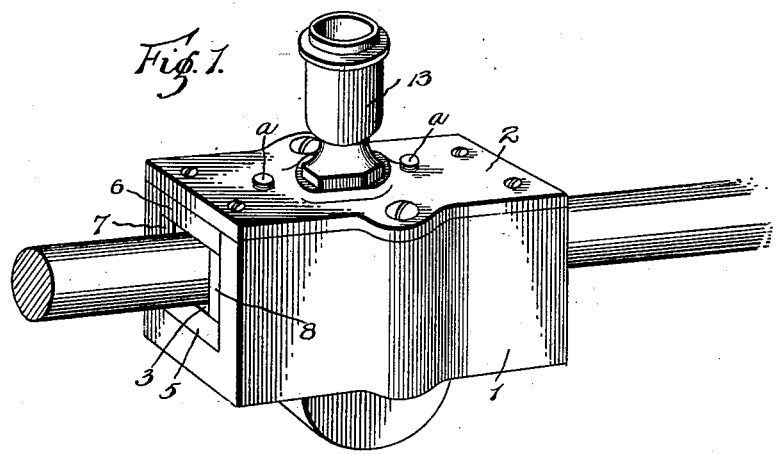
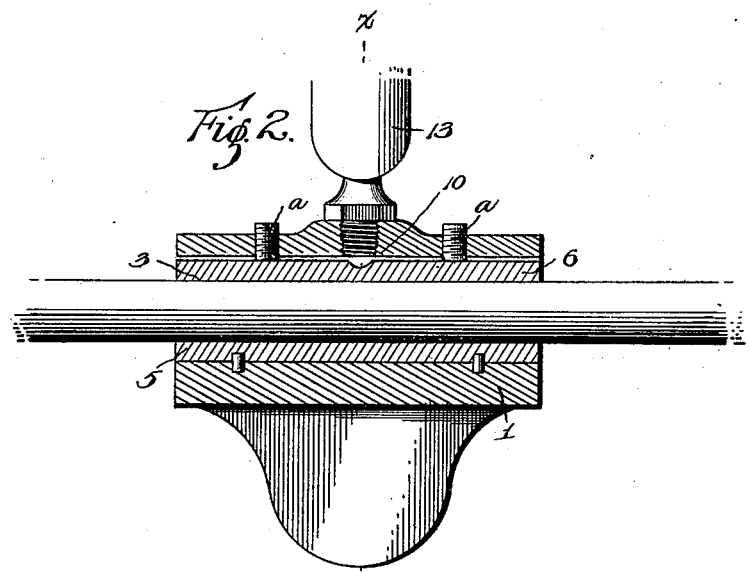
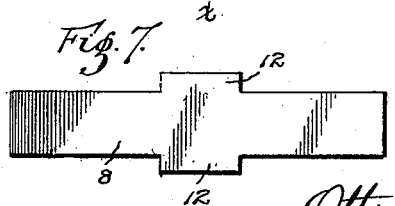
Witnesses
Ralph A. Shepard.
W. C. Lawson.
Inventor
Otto A. Steutermann
by Frank S. Appleman
Attorney
THE NORRIS PETERS CO., PHOTO-LITHO., WASHINGTON, D. C.

No. 666,570.  
Patented Jan. 22, 1901.  
O. A. STEUTERMANN.  
JOURNAL BEARING.  
(Application filed Apr. 14, 1900.)  
(No Model.)  
2 Sheets—Sheet 2.
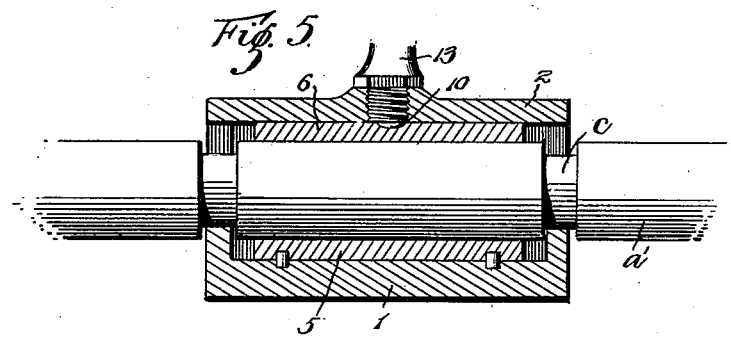
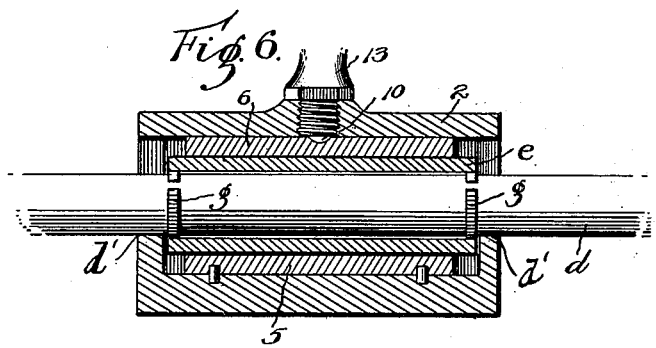
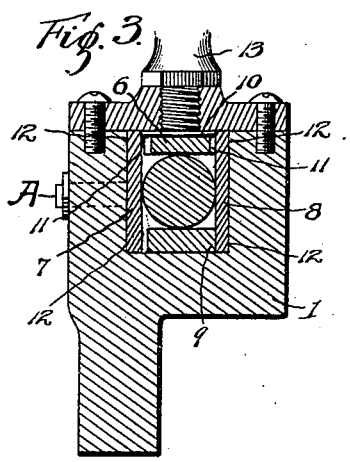
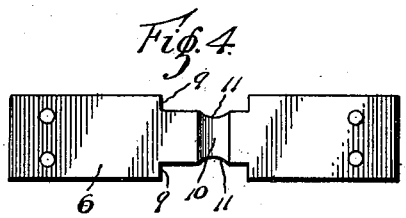
Witnesses  
Ralph A. Shepard  
J. C. Lawson
Inventor  
Otto A. Steutermann  
by Frank S. Appleman  
Attorney
THE NORRIS PETERS CO., PHOTO-LITHO., WASHINGTON, D. C.

UNITED STATES PATENT OFFICE.

OTTO A. STEUTERMANN, OF WEBSTER, MASSACHUSETTS.

JOURNAL-BEARING.

SPECIFICATION forming part of Letters Patent No. 666,570, dated January 22, 1901.

Application filed April 14, 1900. Serial No. 12,804. (No model.)

*To all whom it may concern:*

Be it known that I, OTTO A. STEUTERMANN, a citizen of the United States of America, residing at Webster, in the county of Worcester and State of Massachusetts, have invented certain new and useful Improvements in Journal-Bearings, of which the following is a specification, reference being had therein to the accompanying drawings.

This invention relates to journal-bearings; and it has for one object to provide a bearing in which the shaft will be engaged only at certain points of its periphery, thus having said shaft disengaged between said points in order that lubricant may enter the space between the points of engagement and more readily find its way to the contacting surfaces of the journal-bearing and shaft.

A further object of the invention is to provide means for regulating the size of the bearing for taking up lost motion due to wear and for accommodating shafts of varying dimensions. Furthermore, the object of the invention is to provide a lining for journal-boxes which can be readily removed or applied, thus increasing the wear of said boxes.

A still further object of the invention is to provide a novel form of journal-bearing adapted to contain suitable lubricating material whereby the shaft is partially embedded.

Finally, the object of the invention is to provide a journal-box which will possess advantages in points of simplicity, durability, and efficiency, proving at the same time comparatively inexpensive.

With the above and other objects in view the invention consists in the details of construction and in the arrangement and combination of parts to be hereinafter more fully set forth and claimed.

In describing the invention in detail reference will be had to the accompanying drawings, forming part of this specification, wherein like characters denote corresponding parts in the several views, and in which—

Figure 1 is a view in perspective of a journal-bearing, showing the shaft applied. Fig. 2 is a central longitudinal sectional view of the journal-box with the shaft in elevation. Fig. 3 is a transverse sectional view on the line corresponding with line *x x* of Fig. 2. Fig. 4 is a top plan view of the top plate, and Figs. 5 and 6 are central longitudinal sectional views of the invention in modified forms. Fig. 7 is a view in elevation of one of the side plates.

In the drawings, 1 indicates a journal-box with a top 2, having a central aperture suitably secured to the sides of the box. Longitudinally of the journal-box is a passage-way 3, preferably rectangular in shape, for the reception of a shaft 4. In this passage-way 3 is a lining of suitable metal and consisting of a bottom strip 5, a top strip 6, and side strips 7 and 8. The bottom strip 5 is adapted to fit tightly in the passage-way 3 and has recesses 9 in its edges approximately centrally thereof. The top strip 6, corresponding to the construction of the bottom strip, is adjustably secured to the top 2 in any suitable manner, (here shown as being engaged by the screws A.) Gage-screws *a* are threaded through the top and about the upper surface of the said top plate for the purpose of effecting the proper adjustment of said plate. Centrally of this top strip 6 is a cross-channel 10, directly under the aperture of the top, ending in vertical channels 11 on each side of said plate in the recesses 9, as shown in detail, Fig. 4.

The side strips 7 and 8 are of suitable size and each has lugs 12 adapted to fit tightly in the recesses 9, and the side strip 7 has suitable adjusting means, but preferably screws A, but one of which is shown, threaded through the side of the box and bearing against the strip.

A suitable lubricating-receptacle 13 is secured in or above the aperture of the top.

In practice it will be seen that a journal-box of inferior metal may be used, as the adjustable lining will answer all practical purposes, and when said lining has become worn it can be easily and cheaply replaced in sections or in whole. The channel in the top strip of the lining in communication with the lubricating-receptacle also presents an advantageous improvement as a simple lubricating means that can be easily cleaned.

As shown in Fig. 5, it has been found in practice to be very desirable to make the journal-box slightly longer than the lining and have the bottom strip of the lining a suitable distance below the upper plane of the edges of the ends of the box. It will be noted that by making the journal-box of such construction it will act as a cup and retain the lubricating material that passes through the channels of the upper strip. By this arrangement the wearing of the parts is minimized, as the shaft will always be partly embedded in the lubricating material.

When employing a box of the class just described in connection with a short shaft $a'$, said shaft is provided with a peripheral groove $c$ of such width and depth as to fit over the end or ends of the box without interfering with the travel of the shaft.

When a long shaft $d$ is used in connection with the box just described, it has been found preferable to use bushing 2 on the shaft and to hold said bushing in place to rotate with the shaft by the rings $g$, which being driven between the shaft and bushing connect the parts frictionally that they may rotate together. When so connected, the bushing bears on the plate 5, and the shaft $d$ is on a plane with the surfaces $d'$ of the ends of the box.

It will be understood that changes in the details of construction and the proportions may be made that fairly fall within the scope of the invention, and it will be noted also that a bearing of this description can be used in conjunction with car and vehicle axles, engine-shafts, &c.

Having thus fully described my invention, what I claim as new, and desire to secure by Letters Patent, is—

1. In combination with a journal-box with a top suitably secured thereto and having a rectangular passage-way, a lining for the walls of the passage-way consisting of a top and a bottom strip and side strips interlockingly connected.

2. In combination with a journal-box with a top suitably secured thereto and having a rectangular passage-way, a lining for the walls of the passage-way consisting of a top and a bottom strip and side strips interlockingly connected, and means for adjusting two of the strips.

3. In combination with a journal-box with a top suitably secured thereto and having a rectangular passage-way, a lining for the walls of the passage-way consisting of a top and a bottom strip having recesses approximately centrally of their edges and side strips; each of said side strips having lugs adapted to fit in the recesses of the top and bottom strips.

4. In combination with a journal-box with a top suitably secured thereto and having a rectangular passage-way, a lining for the walls of the passage-way consisting of a top and a bottom strip having recesses approximately centrally of their edges, and side strips; each of said side strips having lugs adapted to fit in the recesses of the top and bottom strips, and means for adjusting two of the strips.

5. In combination with a journal-box with a top suitably secured thereto and having a rectangular passage-way, a lining for the walls of the passage-way consisting of a bottom strip adapted to fit tightly in the passage-way and having recesses in its edges approximately centrally thereof, a top strip corresponding to the construction of the bottom strip adjustably secured to the top, side strips of suitable size having lugs adapted to fit in the recesses of the top and bottom strips, one of said side strips having suitable adjusting means, as and for the purpose set forth.

6. In combination with a journal-box with a top secured thereto and having a rectangular passage-way, a lining for the walls of the passage-way consisting of a bottom strip adapted to fit tightly in the passage-way and having recesses in its edges approximately centrally thereof, a top lining-strip corresponding to the construction of the bottom strip but having threaded apertures suitably placed, and adjustably secured to the box-top by means of screws threaded through the box-top and engaging the apertures of the top strip, side strips of suitable size having lugs adapted to fit in the recesses of the top and bottom strips, one of said side strips being adapted to be adjusted by screws threaded through the side of the box and bearing against the said strip, as and for the purpose set forth.

7. In combination with a journal-box with a top suitably secured thereto and having a rectangular passage-way, a lining for the walls of the passage-way consisting of a bottom strip adapted to fit tightly in the passage-way and having recesses in its edges approximately centrally thereof, a top strip corresponding to the construction of the bottom strip but having threaded apertures suitably placed, and adjustably secured to the box-top by means of screws threaded through the box-top and engaging apertures of the top strip, gage-screws also threaded through the top and adapted to abut the upper surface of said top strip, side strips of suitable size having lugs adapted to fit in the recesses of the top and bottom strips; one of said side strips being adapted to be adjusted by screws threaded through the side of the box and bearing against the said strip.

8. A journal-box having a longitudinal passage-way, a top having a central aperture suitably secured to the box, a lubricating-receptacle secured to said top over the aperture, an adjustable lining for the passage-way consisting of top, bottom and side strips; said top plate having a cross-channel directly under the apertures of the top ending in vertical channels, as and for the purpose set forth and described.

9. In combination, a journal-box having a rectangular, longitudinal passage-way, an adjustable lining for the said passage-way, a shaft, and suitable lubricating means for the shaft.

In testimony whereof I affix my signature in the presence of two witnesses.

OTTO A. STEUTERMANN.

Witnesses:
THOMAS I. SULLIVAN,
ELMER P. WALKER.